Feb. 16, 1960

C. A. HUBERT ET AL 2,924,995

CREEPER-SPEED DRIVE FOR TRACTOR

Filed May 24, 1956

Inventors,
Clarence A. Hubert
Jerrold A. Isaacson
Paul O. Pippel Atty.

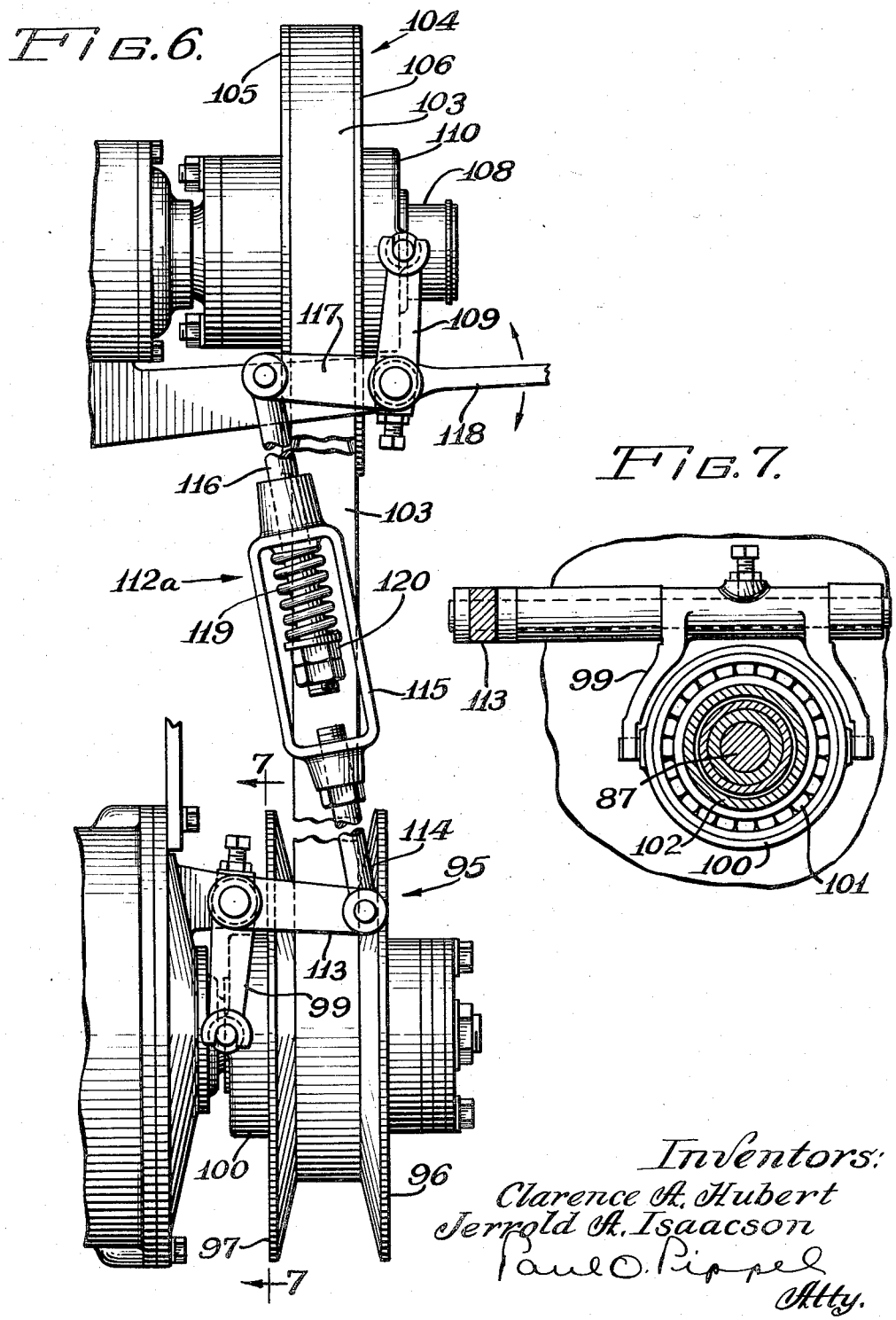

United States Patent Office 2,924,995
Patented Feb. 16, 1960

2,924,995
CREEPER-SPEED DRIVE FOR TRACTOR

Clarence A. Hubert, Chicago, and Jerrold A. Isaacson, Lombard, Ill., assignors to International Harvester Company, a corporation of New Jersey Application May 24, 1956, Serial No. 586,967

6 Claims. (Cl. 74—745)

This invention relates to tractors of the wheel type but is more specifically directed to the provision of a very low-speed or creeper drive for such tractors.

Ordinarily, tractors of this type are provided with change-speed transmissions which effectively operate the tractor at a variety of predetermined speeds, but the slowest of these speeds is usually in a speed range that is too high for some uses to which such equipment may be suitably applied. For instance when transplanting vegetables, tobacco, flowers and nursery stock, or when planting flower bulbs, or in the operation of mounted threshers, cotton pickers and the like, as well as in other special harvesting jobs, it is desirable that the tractor be propelled at extremely low speeds. Such speeds, which may range from 0.5 m.p.h. to 1.25 m.p.h. in the lowest and from 3.5 m.p.h. to 8 m.p.h. in the highest speed ranges, are usually spoken of as creeper speeds, and, for best results, it is highly desirable that these speeds be obtainable at full power. Furthermore, it is desirable that such creeper speeds be obtainable by means which will not interfere in any way with the ordinary operation of the tractor when it is used with regular or conventional equipment at normal tractor speeds.

The principal object of the present invention, therefore, is to provide an improved creeper-speed drive for a tractor wherein such drive is operable through all speed ranges of the change-speed transmission unit employed with a standard tractor without substantial remodeling or rearrangement of said tractor.

Another object is to provide a tractor drive mechanism which is so arranged as to permit a tractor to be driven at a plurality of creeper speeds, and wherein the standard change-speed transmission unit of the tractor may be utilized for selectively obtaining various creeper speeds.

A further object is to provide a creeper-speed drive adaptable to tractors that utilize an auxiliary shaft that is connected to a power take-off shaft and wherein said auxiliary shaft is alternately serviceable for a driving connection with the standard change-speed transmission unit, and operable while the main clutch of the tractor is disconnected, for transmitting power through the change-speed transmission unit to the traction propelling means.

A still further object is to provide, in a tractor utilizing an auxiliary shaft that is connected to a power take-off shaft and wherein said auxiliary shaft is alternately adapted as a driving connection with the standard change-speed transmission unit, and operable while the main clutch of the tractor is disconnected, for transmitting power through the change-speed transmission unit to the traction propelling means, an infinitely variable speed drive mechanism which is drivingly connectable between said auxiliary shaft and said change-speed transmission unit.

A yet still further object is to provide a creeper-speed drive mechanism that incorporates a gear train and an infinitely variable speed drive unit drivingly connected between a forwardly disposed auxiliary shaft and the standard change-speed transmission unit of a tractor, and which is operable while the main clutch of the tractor is disconnected, for transmitting power through the change-speed transmission unit to the traction propelling means.

An additional important object is to provide a creeper-speed drive for a tractor which is operable through all speed ranges of the standard change-speed transmission thereof so as to provide an infinite range of speeds both forward and reverse within each speed range of the tractor's change-speed transmission.

Further objects and advantages of the present invention will be apparent from the full description, reference being had to the accompanying drawings wherein a preferred form of the invention is clearly shown.

Figure 1 is a side elevational view of a tractor incorporating a creeper-speed drive therein;

Figure 2 is a diagrammatic elevational view including a traction wheel of a tractor, an engine for such tractor, a change-speed transmission connected with the engine through a disconnectable clutch for driving the tractor in normal operation, together with an auxiliary engine-driven power transmission, operable when the main clutch is disconnected, for transmitting driving force to the traction wheels via a power take-off shaft and the change-speed transmission;

Figure 6 is an end elevational view of the infinitely variable speed drive mechanism;

Figure 7 is a partial vertical sectional view taken on line 7—7 of Figure 6.

Figure 1:
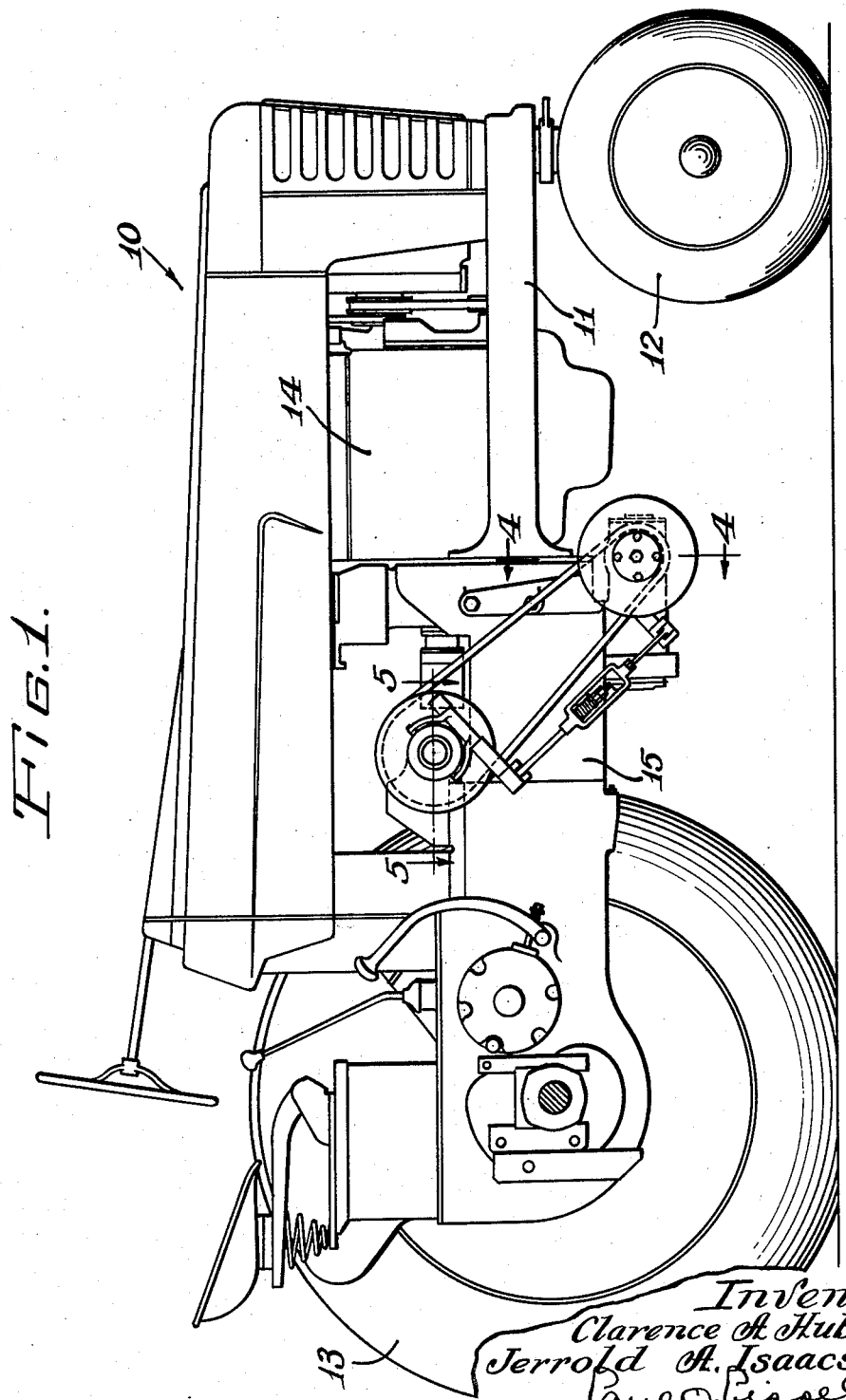

Referring now to the drawings, it will be noted that the tractor, designated generally by the reference character 10, which has been selected for illustrating a preferred form of the invention, is of conventional design and includes a longitudinally extending frame or chassis 11, a steerable front wheel assembly 12, a pair of spaced rear traction wheels 13, a driving engine 14, a change-speed transmission unit 15 and a differential drive unit 16. Other details, which have been illustrated only to show their general relationship, have not been designated with reference numerals inasmuch as such details are not essential to the inventive concepts hereof and to do so might tend to make the drawings unnecessarily complex.

The engine 14, which may be any suitable standard engine employed of such purposes, is mounted by conventional means to the frame 11 and is drivingly connected by a shaft 17 to a main clutch 18 where said shaft is constrained for rotation with the driving element 19 thereof, while the driven disk 20 of said clutch is constrained for rotation with a drive shaft 21 which extends into the change-speed transmission unit 15. This clutch is of the generally conventional spring-loaded type wherefor the means for controlling the engagement and disengagement thereof is not shown.

Within said transmission unit the drive shaft 21 is secured to a gear cluster designated generally as 22, which contains the axially spaced gears 23 and 24 and one-half of a toothed jaw clutch, indicated in its entirety by the numeral 25. The other complemental and cooperating half of said toothed clutch is fashioned as part of an axially slidable gear cluster, designated as 26, that additionally includes the axially spaced gears 27, 28, 29 and 30. The cluster 26 is slidably mounted by means of the sleeve or quill 31 on a shaft 32. A shifter fork 33 and an attached control lever 34 may be provided for actuating or affecting lengthwise shifting or axial sliding of the gear cluster 26 on a splined portion 35 of the shaft 32. The change-speed transmission unit 15, in addition to the shafts 21 and 32 and the gear cluster 26, comprises an additional shaft 36 which extends therethrough, and a plurality of axially spaced gears 37, 38, 39, 40 and 41, arranged in a sleeve-like cluster or quill, indicated generally by the reference numeral 42, which is mounted for rotation freely about said shaft 36. A reverse idler gear cluster 43 having gears 44 and 45 on opposite ends thereon is mounted for free rotation on a shaft (not shown) and is arranged to engage selected gears of the clusters 26 and 42, as hereinafter described.

Figure 2:
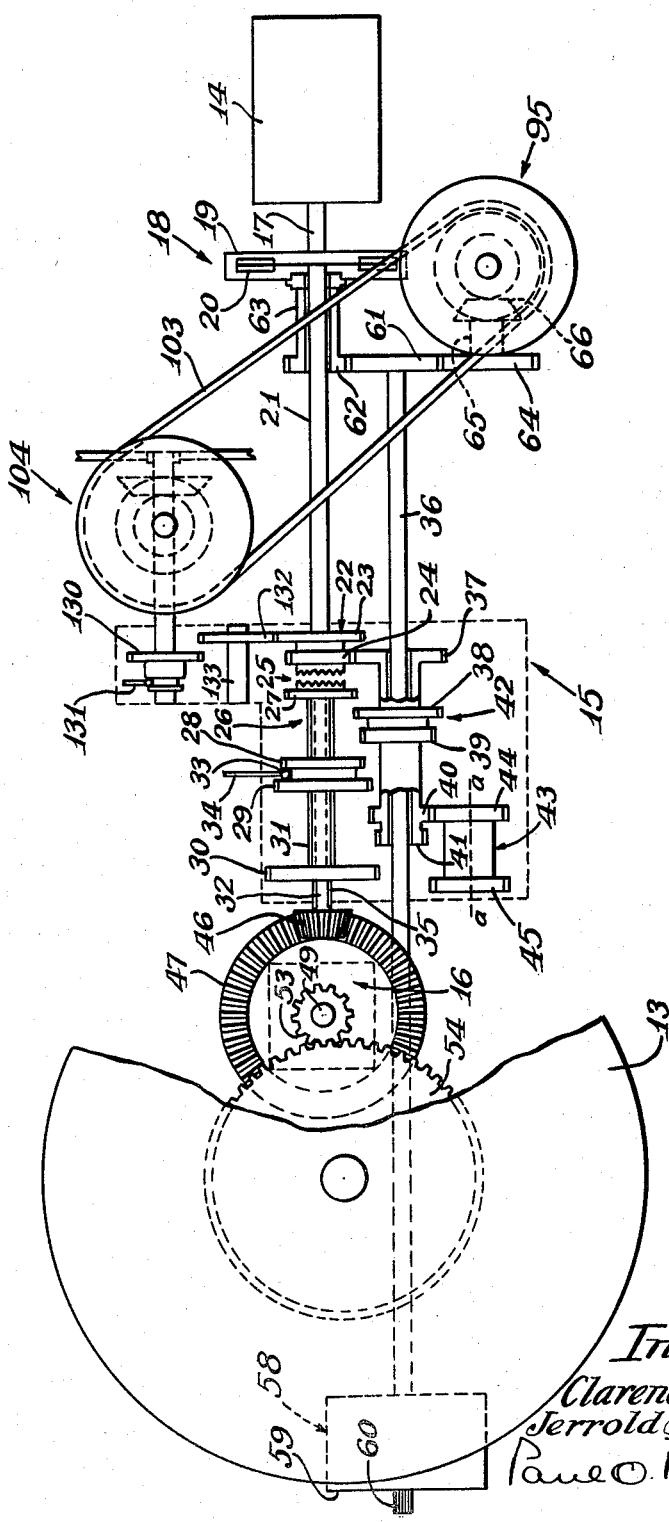

When the gear clusters 26 and 42, clutch 25, and the reverse idler 43 are in the positions shown in Figure 2, the transmission unit 15 is in neutral and incapable of transmitting power from the driving shaft 21 to the driven shaft 32. Movement of gear cluster 26 forwardly, to the right as viewed in Figure 2, a selected distance so that gear 30 meshes with gear 41, establishes the first or lowest speed power train through the transmission unit. Movement of gear cluster 26 rearwardly, to the left as viewed in Figure 2, for meshing gear 29 with gear 40, establishes the second speed power train, whereas movement of gear cluster 26 forwardly, so that gear 28 meshes with gear 39, establishes the third speed power train and movement of gear cluster 26 rearwardly, so as to mesh gear 27 with gear 38, establishes the fourth speed train. Movement of gear cluster 26 forwardly, so as to engage the complemental portions of the jaw clutch 25, establishes the fifth or highest speed power train through the transmission unit. This latter movement, it will be appreciated, establishes a direct drive from the engine 14 through the transmission unit.

The reverse idler gear cluster 43 is arranged so that gear 44 thereon is in constant mesh with gear 40, which latter gear forms part of the cluster 42, and rotates therewith. The axis a—a upon which said idler gear cluster is located, for convenience of illustration, is shown below the shafts 21 and 36 (Figure 2) whereas, in fact, it is disposed at such a position circumferentially of said shafts that the gear 45 thereon is brought into mesh with the driven shaft gear 30 when the gear cluster 26 is shifted rearwardly a predetermined distance. When the gear train is thus established power is transmitted from the gear 40 to the gear 30 for driving the driven shaft 32 in a direction opposite that to which this shaft is ordinally driven by the selected meshing of the gears upon the gear clusters 26 and 42. The various gears upon the drive shaft 21, driven shaft 32 and shaft 36 constitute means for driving the driven shaft 32 from the drive shaft 21 at selectively different speeds.

The shaft 32 has a beveled pinion gear 46 fixedly mounted on the rear end thereof which engages and drives a beveled ring gear 47 that, together with the differential drive unit 16, forms a portion of the final drive for the tractor. Coaxial shafts 48 and 49 are differentially driven by the differential unit 16 and a gear 50 constrained for rotation with the shaft 48 meshes with and drives a gear 51 which is fixed to the axle 52, while gear 53 on the shaft 49 meshes with and drives a gear 54 which is constrained for rotation with the axle 55. The axles 52 and 55, respectively, are, in turn, journaled in bearing members 56 and 57 which are suitably mounted in a housing 11a that may form part of the rear portion of the frame or chassis 11. It will be appreciated, therefore, that the transmission driven shaft 32 is drivingly connected with the traction wheels or ground-engaging propelling means through the differential drive unit 16 and the axle shafts 52 and 55.

A power take-off unit, designated generally by the numeral 58, at the rear end of the tractor is disposed within a casing 59 that is suitably secured to the portion of the tractor chassis 11 which serves as the housing 11a that encloses the final drive of the tractor. The additional shaft 36, which extends into said casing 59 and is alternately serviceable as a power take off shaft drivingly connected with the engine, is suitably coupled to gear members (not shown) disposed within said casing, while a final power take-off splined shaft 60, extending from the rear of said casing, may be equipped with a pulley or any other suitable driving or coupling device, as desired. The rear power take-off unit 58 is drivingly connected by the shaft 36 and gear 61, secured to said shaft at the forward end thereof, to a gear 62 which is constrained for rotation with the driving element 19 of the main clutch 18. Thus power is transmitted from the engine 14, through the shaft 17 and the driving element 19 of clutch 18, to the meshing gears 62 and 61 and thence to the shaft 36 which, in turn, is coupled to the power take-off unit 58. Since the gear 62 is fixedly secured by a sleeve-like hub or quill 63 to the driving element 19, of the main clutch 18, and adapted for rotation therewith, it will be seen that power may be independently transmitted from the engine 14 to the power take-off unit 58 regardless of whether the clutch 18 is engaged or disengaged, and hence power will always be available at said rear power take-off unit when the engine 14 is operating.

At the forward end of the tractor there is provided an auxiliary power transmission mechanism, alternately serviceable as a power take-off drivingly connected with the standard change-speed transmission unit, which is arranged to transmit the power required for the creeper-speed drive in accordance with the teachings of the present invention, as well as to provide an independent forwardly disposed power take-off.

Figure 3:
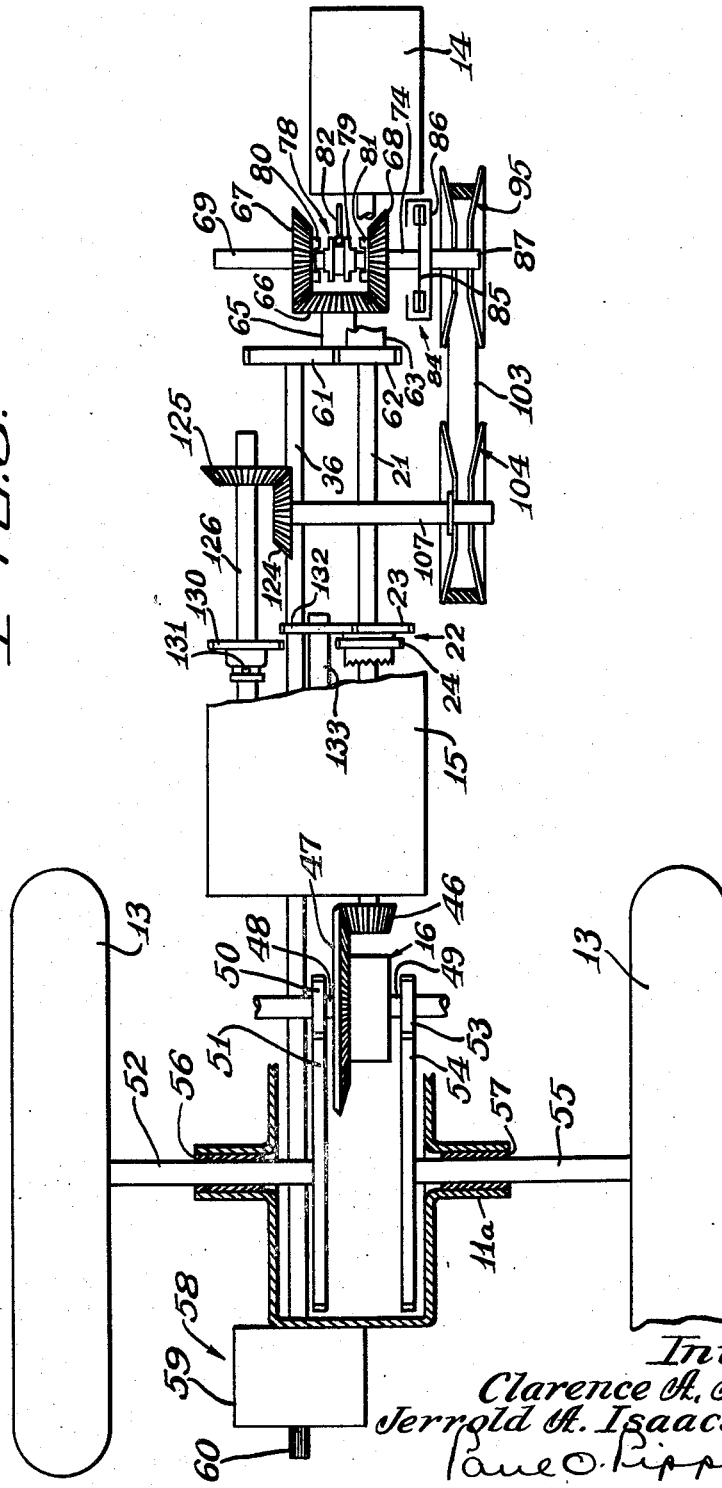
Figure 3 is a diagrammatic plan view of the arrangement shown in Figure 2, but shown with certain portions broken away for purposes of clarity.
Figure 4:
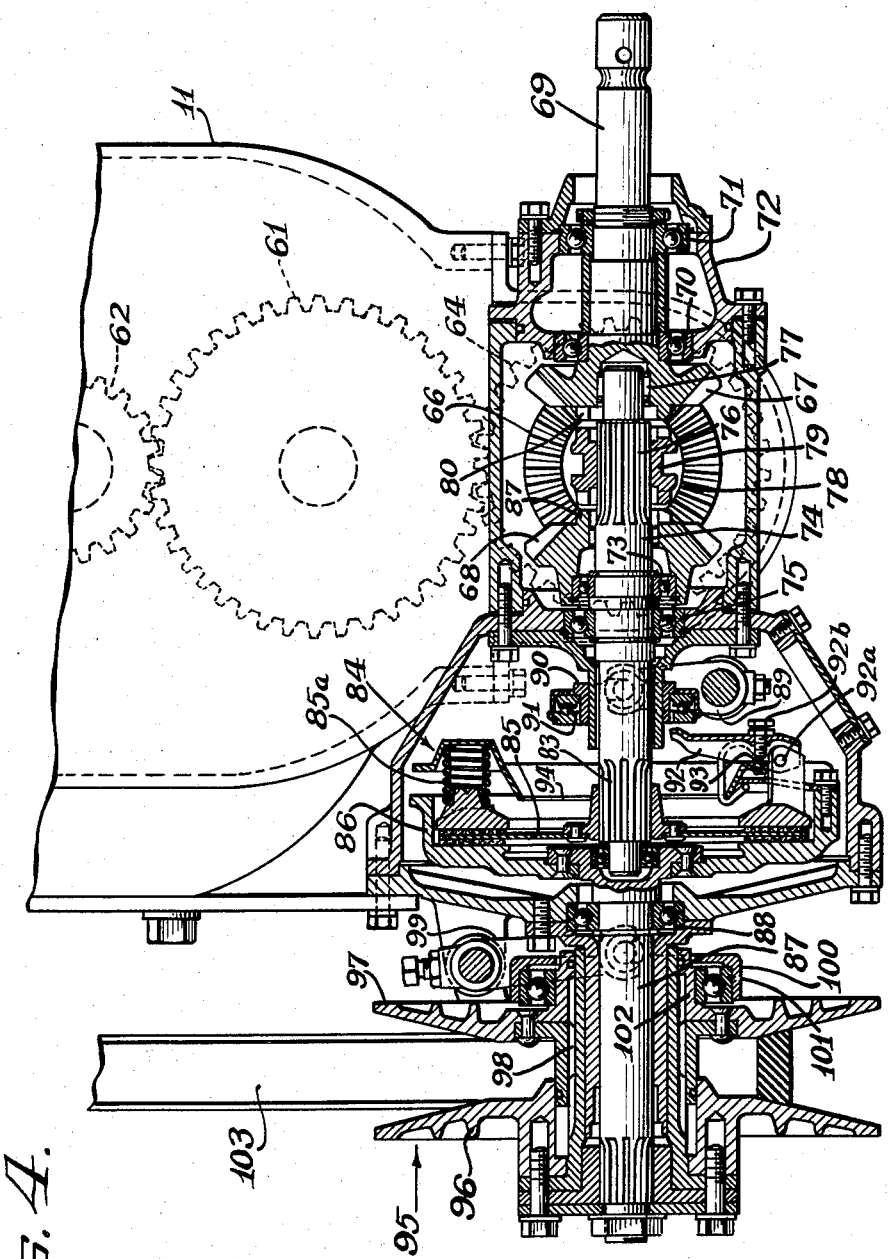
Figure 4 is a partial vertical sectional view taken on line 4—4 of Figure 1 and showing the arrangement of the front power take-off shaft and drive mechanism.
Figure 5:
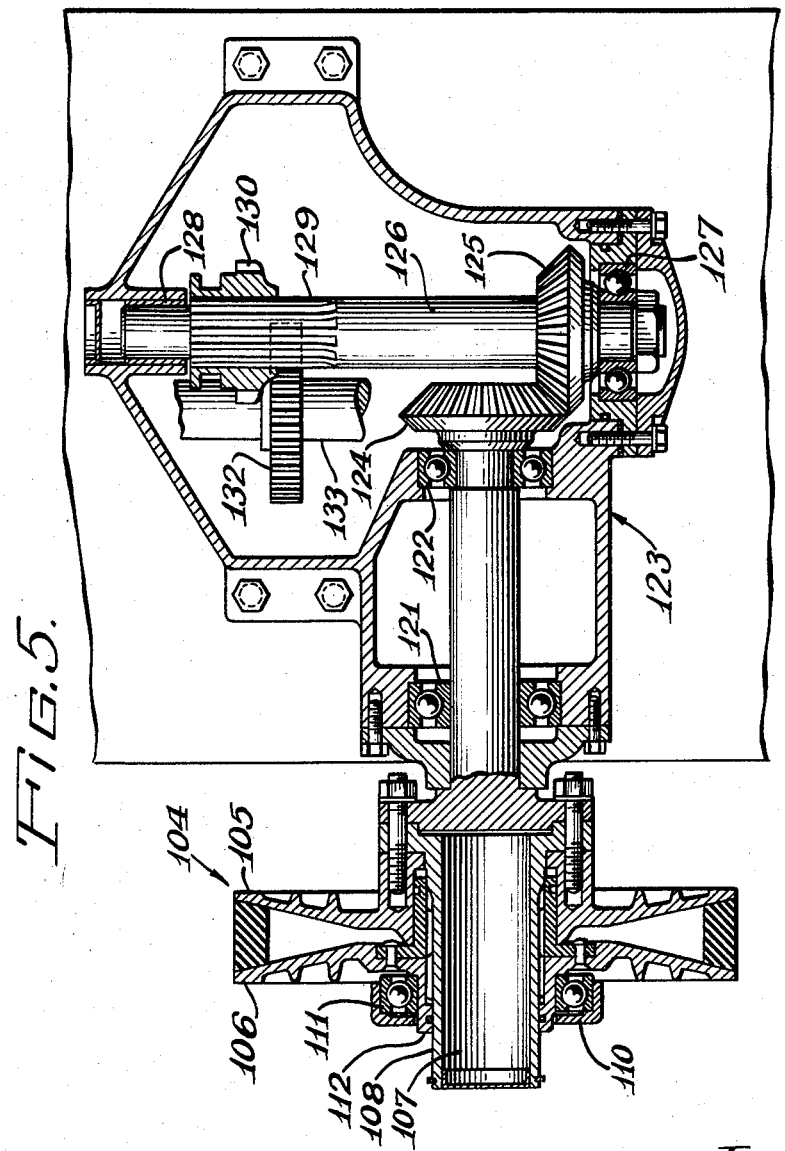
Figure 5 is a partial horizontal sectional view taken on line 5—5 of Figure 1.

The gear 61, on shaft 36, meshes with and drives a gear 64 affixed to a short auxiliary shaft 65 which has on the opposite end thereof a beveled gear 66 that rotates therewith and constantly meshes with and drives axially spaced beveled gears 67 and 68. The gear 67 is mounted on a shaft 69 (see Figs. 3 and 4) which may be suitably journaled by anti-friction bearings 70 and 71 in a housing or casing 72 that is suitably secured to the forward portion of the tractor chassis 11. The shaft 69, which serves as a forward power take-off, receives power from the auxiliary driving shaft 65 via the meshing beveled gears 66 and 67 and operates at all times while the engine 14 is running, as does the rear power take-off unit 58. An oppositely positioned beveled gear 68 is journaled by means of an anti-friction bearing 73 on a shaft 74 which shaft, in turn, is journaled by means of an anti-friction bearing 75 in the housing 72. The inner end of the shaft 74 is splined as shown at 76, while a reduced end portion of said shaft is journaled by a bearing 77 mounted within a recess in the beveled gear 67. A double-acting dental-type clutch, indicated generally at 78, has a centrally disposed axially slidable portion 79 that is internally splined and mounted on a splined portion 76 of the shaft 74. One toothed jaw portion 80 of said dental clutch is affixed to the gear 67, while another toothed jaw portion 81 is affixed to the gear 68. The central member 79, which is fashioned with teeth on both sides that are complemental to teeth in the respective jaw portions 80 and 81, may be slidably actuated by a shifter fork lever 82 so as to either engage the central toothed member 79 with the jaw portion 80 or with the jaw portion 81. When the cooperating clutch members 79 and 80 are drivingly engaged the shaft 74 rotates in one direction, but when the cooperating clutch members 79 and 81 are drivingly connected together the shaft 74 rotates in the opposite direction. The shaft 69 rotates always in the same direction. When the member 79 is centered midway between the members 80 and 81, as shown in Figure 4, the shaft 74 remains at rest while the shaft 69 is rotating.

The shaft 74 is drivingly connected by way of a splined portion 83 on the opposite end thereof with a generally conventional secondary spring-loaded clutch 84. The splined shaft portion 83 has slidably splined thereon a driving disk element 85, which is spring-loaded, by means of a plurality of circumferentially spaced springs 85a (only one of which is shown), into engagement with a driven element 86 thereof that is constrained for rotation with a shaft 87, in turn, journaled by an anti-friction bearing 88 in the housing 72. Since said clutch is spring-loaded the driving disk element 85 is normally in frictional engagement with the driven element 86 and the shaft 74 thus is drivingly connected to the shaft 87. This secondary clutch may be actuated for disengagement by means of an actuating fork member 89 pivotally connected to a throw-out collar 90 that slides axially and carries a throw-out bearing 91 therewith. The bearing 91, upon slidable axial movement in one direction, engages a plurality of circumferentially spaced finger members 92 (only one of which is shown in Figure 4) pivotally mounted as at 92a on the driving disk element 85. Each of these actuating fingers contains an adjusting screw 92b which is adapted to engage an antifriction bearing member 93 carried by a back-up plate 94 mounted on the driven element 86. As the bearing 91 engages the fingers 92 said fingers tend to rotate about their pivots 92a thus pressing the respective screws 92b into engagement with the anti-friction bearing 93 and thereby cause a fulcruming action about said screws which raises the driving disk element 84, against the reaction of the springs 85a, away from its frictional engagement with the driven element 86 to drivingly disconnect the driving and driven elements thereof. With this arrangement it will be appreciated that shaft 74 may readily be drivingly connected to or disconnected from shaft 87 under load.

The shaft 87 has a variable diameter pulley or sheave, indicated generally by the reference numeral 95, mounted thereon and constrained for rotation therewith. Said pulley comprises a first frusto-conical shaped flange portion 96 which is suitably splined to the shaft 87, and a second opposed frusto-conical shaped flange portion 97 which is splined to a hub portion 98 of said first flange portion 96 and mounted so as to be axially slidable therealong. As is well understood the effective pitch diameter of this pulley may be varied by changing the axial displacement between the two opposed belt engaging surfaces or flange portions thereof. A forked operating lever 99 is pivotally connected to a hub or collar member 100 which encases an anti-friction bearing 101 and which, in turn, is carried by a hub portion 102 of said flange portion 97. Hence as said forked operating lever is pivotally rotated the collar 100 will press against the bearing member 101 and effect an axial displacement of the flange portion 97 to alter the effective pitch diameter of the pulley 95.

The pulley 95 is drivingly connected by a generally V-shaped belt 103 with a similar cooperating variable diameter pulley or sheave 104 mounted on the upper portion of the tractor chassis 11. Said latter pulley comprises the opposed frusto-conical shaped flange portions 105 and 106 wherein the first flange portion 105 is constrained for rotation with a shaft 107, while the latter flange portion 106 is splined to a hub portion 108 of said first flange portion 105 and mounted so as to be axially slidable therealong. A forked operating lever 109, pivotally connected to a hub or collar member 110 which encases an anti-friction bearing 111 that is journaled on a hub portion 112 of the flange portion 106, is so arranged that when said lever is pivotally rotated the collar 110 will press against the bearing member 111 and effect an axial displacement of the flange portion 106 and thus change the effective pitch diameter of the pulley 104.

The axial displacement of the pulleys 95 and 104 toward and away from each other is coordinated by means of an interlocking mechanism or interconnecting linkage, indicated at 112a, so that when one pulley increases the axial displacement between its respective opposed flange portions to increase its pitch diameter the other pulley will correspondingly decrease the displacment between its respective flange portions, to decrease the pitch diameter thereof, and vice versa. To accomplish this coordinated movement a lever 113, secured at one end thereof to the forked operating lever 99, is pivotally connected at its opposite end to a rod 114 that is threadably mounted in one end of a shock absorber 115, the opposite end of which shock absorber slidably receives a rod 116 which is pivotally secured at one end thereof to a lever 117 that, in turn, it attached to the upper forked operating lever 109. An extension 118 on said lever 117 may be used as an actuating arm or handle for operating said interconnecting and coordinating mechanism 112a. The end of rod 116, opposite that attached to lever 117, is received in a coil spring 119 which is compressibly disposed between an end portion of the shock absorber 115 and a locking nut 120 that is threaded onto the free end of said rod. Now as the lever 118 is operated, for instance, to increase the displacement between the flange portions 105 and 106, of pulley 104, the interconnecting linkage 112a will function to impart an oppositely directed axial movement to pulley 95 so as to decrease the displacement between the flange portions 96 and 97 of said latter pulley a corresponding amount, whereupon the belt 103 will follow the modified effective pitch diameters of each of said pulleys to effect the speed ratio change desired. A particular advantage for a speed-change device of this character is that the change in ratio between the pulley diameters is made while the pulleys are in operation. This characteristic permits such changes to be made while the tractor itself is in motion, instead of having to come to a full stop as is usually done at present in order that the speed ratio thereof be changed from one speed to the other.

The shaft 107 is journaled by the spaced-apart anti-friction bearings 121 and 122 in a gear housing or casing 123 which is suitably secured to the change-speed transmission unit 15. The shaft 107, gear housing 123 and the contents thereof all form part of the conventional pulley drive mechanism usually provided on tractors of the character encompassed herein. The opposite end of said shaft 107 has affixed thereto for rotation therewith a beveled gear 124 which meshes with and drives another beveled gear 125 constrained for rotation with a shaft 126 normally disposed with respect to shaft 107. The shaft 126, which is journaled in the housing 123 by means of the antifriction bearing 127 and bearing 128, has a splined portion 129 thereon that receives an axially slidable gear 130 that is slidably actuated by a shifter fork and lever 131. The gear 130 is slidably shiftable axially to mesh with and drive a gear 132 mounted on a shaft 133 and which is in constant mesh with gear 23, of gear cluster 22, in the change-speed transmission unit 15.

When the tractor is operated under normal conditions power is transmitted from the engine 14 by way of shaft 17 to the driving element 19, and thence, since the driving and driven elements of clutch 18 are normally in frictional engagement because of the spring-loading thereof, to the shaft 21 and into the change-speed transmission unit 15. After the desired gear selection has been made, by meshing the respective gears of clusters 26 and 42, power is transmitted by way of the pinion and ring gears 46 and 47, respectively, through the differential and final drive to the ground-engaging propelling means or traction wheels 13—13. As previously explained, power is also independently and simultaneously available, at the rear power take-off shaft 60 as well as at the front power take-off shaft 69, through the quill gear 62 which is constrained for rotation with the driving element 19 of the primary clutch 18.

Now when it becomes desirable to utilize the creeper drive, in accordance with the teachings of the present invention, the primary clutch 18 is disengaged by suitable actuating means (not shown) and the disconnectable driving connection or clutch 78 actuated so as to engage the portion 79 thereof with either portion 80 or 81. If, for instance, element 79 is moved to the left, as viewed in Figure 4, it will engage element 81 and the shaft 74 will rotate in a predetermined direction. Since clutch 84 is spring-loaded the driving and driven elements thereof will normally be in constant frictional engagement and power will be transmitted from the shaft 74 to the shaft 87 and pulley 95 thereon. The motion of pulley 95 is transmitted by the belt 103 to the pulley 104 and shaft 107, from whence it is transmitted by the beveled gears 124 and 125 to the shaft 126. Now in order to drivingly connect this power train into the change-speed transmission it is necessary to axially slide the gear 130 on the shaft 129 so that it meshes with and drives the gear 132 which is in constant mesh with gear 23 in said change-speed transmission unit. Power will now be transmitted from the front power take-off drive mechanism, through the variable diameter pulley drive, to the change-speed transmission unit where the gear ratio may be changed at will, as in normal operation thereof. In addition, however, the speed ratio may also be changed by the variable diameter pulley drive mechanism to provide an almost limitless number of finely graduated speed variations. Furthermore, by shifting the central member 79, of dental clutch 78, to the right so as to engage the toothed portion 80 the direction of rotation of the shaft 74 may be reversed and this direction of rotation may be transmitted through the change-speed transmission unit 15 to change the direction of motion of the tractor without having to utilize the reverse idler gear cluster 43 thereof.

From the foregoing it should now be apparent that the present invention affords a novel arrangement for providing a tractor with a creeper-drive that is operable for driving the tractor in an almost limitless number of speed variations in either a forwardly or rearwardly direction. Although only a preferred form of the invention has been shown and described it will be apparent to those skilled in the art that various modifications may be made therein without departing from the spirit of the invention or from the scope of the appended claims.

What is claimed is:

1. In a tractor, a power plant; traction propelling means driven from said power plant; a main disengageable clutch having driving and driven members and being drivingly connectable between said power plant and said traction propelling means; a change-speed transmission having a drive shaft selectively connectable to a driven shaft through gear trains of different speed ratios and of which the driven shaft is operatively connected with the traction propelling means and having the drive shaft thereof operatively connected with the driven member of said main clutch; an independent power take-off shaft; drive transmitting means including an auxiliary shaft operatively connecting said power take-off shaft with the driving member of said main clutch for operation therewith; and a creeper-speed drive for the traction propelling means, comprising an infinitely variable speed drive mechanism having driving and driven shafts, a disconnectable driving connecting means disposed drivingly between said drive transmitting means and the driving shaft of said variable speed drive, an auxiliary gear train disposed drivingly between the driven shaft of said variable speed drive and the change-speed transmission, and having said creeper-speed drive arranged for transmitting power therethrough from said power plant to any one of the selectable speed ratio gear trains of said transmission only when said main clutch is disengaged.

2. In a tractor, a power plant; traction propelling means driven from said power plant; a main disengageable clutch having driving and driven members and being drivingly connectable between said power plant and said traction propelling means; a change-speed transmission having a drive shaft selectively connectable to a driven shaft through gear trains of different speed ratios and of which the driven shaft is operatively connected with the traction propelling means and having the drive shaft thereof operatively connected with the driven member of said main clutch; an independent power take-off shaft; drive transmitting means including an auxiliary shaft operatively connecting said power take-off shaft with the driving member of said main clutch for operation therewith; and a creeper-speed drive for the traction propelling means, comprising an infinitely variable speed drive mechanism including driving and driven shafts, a disconnectable driving connecting means disposed drivingly between said drive transmitting means and the driving shaft of said variable speed drive, said connecting means being operable in one position to impart one direction of rotation to the driving shaft of said variable speed drive and operable in another position to impart a reverse direction of rotation to the driving shaft of said variable speed drive, an auxiliary gear train disposed drivingly between the driven shaft of said variable speed drive and the change-speed transmission, and having said creeper-speed drive arranged for transmitting power therethrough from said power plant to any one of the selectable speed ratio gear trains of said transmission only when said main clutch is disengaged.

3. In a tractor, a power plant; traction propelling means driven from said power plant; a main disengageable clutch having driving and driven members and being drivingly connectable between said power plant and said traction propelling means; a change-speed transmission having a drive shaft selectively connectable to a driven shaft through gear trains of different speed ratios and of which the driven shaft is operatively connected with the traction propelling means and having the drive shaft thereof operatively connected with the driven member of said main clutch; a forwardly disposed power take-off shaft; drive transmitting means including an auxiliary shaft operatively connecting said power take-off shaft with the driving member of said main clutch for operation therewith; and a creeper-speed drive for the traction propelling means, comprising an infinitely variable speed drive mechanism including driving and driven shafts, a secondary disengageable clutch having driving and driven members, a disconnectable driving connecting means disposed drivingly between said drive transmitting means and the driving member of said secondary clutch and having the driven member of said secondary clutch drivingly connected with the driving shaft of said variable speed drive, an auxiliary gear train disposed drivingly between the driven shaft of said variable speed drive and the change-speed transmission, and having said creeper drive arranged for transmitting power therethrough from said power plant to any one of the selectable speed ratio gear trains of said transmission only when said main clutch is disengaged.

4. In a tractor having traction propelling means driven from an engine through a main disengageable clutch having driving and driven members, and a change-speed transmission having a driveshaft, a driven shaft and a plurality of gear trains of different speed ratios and having the driveshaft thereof operatively connected to the driven member of said clutch and selectively connectable to said driven shaft through said gear trains of different speed ratios and of which the driven shaft is operatively connected with the traction propelling means, the combination of a creeper-speed driving unit comprising, a first auxiliary gear train driven by the driving member of said main clutch, an infinitely variable speed drive mechanism including driving and driven shafts, a secondary disengageable clutch having driving and driven members, a disconnectable reversing means drivingly disposed between said first auxiliary gear train and the driving member of said secondary clutch whereby the direction of rotation transmitted from said auxiliary first gear train to said secondary clutch is reversible, the driven member of said secondary clutch being drivingly connected to the driving shaft of said variable speed drive, a second auxiliary gear train including disconnectable means therein disposed drivingly between the driven shaft of said variable speed drive and the change-speed transmission driveshaft, and having said creeper-speed driving unit arranged for transmitting power therethrough from said engine to any one of the selectable speed ratio gear trains of said transmission only when said main clutch is disengaged.

5. In a tractor, a power plant; traction propelling means driven from said power plant; a main disengageable clutch having driving and driven members and being drivingly connectable between said power plant and said traction propelling means; a change-speed transmission having a drive-shaft selectively connectable to a driven shaft through gear trains of different speed ratios and of which the driven shaft is operatively connected with the traction propelling means and having the drive-shaft thereof operatively connected with the driven member of said main clutch; a forwardly disposed power take-off shaft; drive transmitting means including an auxiliary shaft and two meshing beveled gears with the first of said gears mounted for rotation with the auxiliary shaft and the second thereof for rotation with said power take-off shaft and operatively connecting said power take-off shaft with the driving member of said main clutch for operation therewith; and a creeper-speed drive for the traction propelling means, comprising a first variable diameter pulley, a disengageable secondary clutch having driving and driven members, a third beveled gear disposed in meshing relation with said first beveled gear, a disconnectable driving connecting means drivingly disposed between said beveled gears and the driving member of said secondary clutch and alternatively connectable through the first and second beveled gears and through the first and third beveled gears for transmitting drive from said auxiliary shaft to the driving member of said secondary clutch, the driven member of said secondary clutch being drivingly connected to said first variable diameter pulley, a second variable diameter pulley, a belt drivingly interconnecting said pulleys, means for varying the diameter of each of said pulleys, a disconnectable auxiliary gear train disposed drivingly between said second pulley and the change-speed transmission, and having said creeper-speed drive arranged for transmitting power therethrough from said power plant to any one of the selectable speed ratio gear trains of said transmission only when said main clutch is disengaged.

6. A creeper-speed drive as characterized in claim 5 wherein the disconnectable driving connecting means includes means positionable in one position for driving the driving member of said secondary clutch in one direction of rotation, and positionable in another position for reversing the direction of rotation of the driving member of said secondary clutch.

References Cited in the file of this patent

UNITED STATES PATENTS

| | | |
|---|---|---|
| 2,287,302 | Gifford et al. | June 23, 1942 |
| 2,349,880 | Orelind | May 30, 1944 |
| 2,757,550 | Weinfurt | Aug. 7, 1956 |

FOREIGN PATENTS

| | | |
|---|---|---|
| 243,182 | Switzerland | June 30, 1946 |